United States Patent [19]
Croswell

[11] Patent Number: 6,164,895
[45] Date of Patent: Dec. 26, 2000

[54] TRAILER HITCH MOUNTED LIFTING ATTACHMENT

[76] Inventor: Edward M. Croswell, 2862 Galway Bay Dr., Metamora, Mich. 48455

[21] Appl. No.: 09/287,708

[22] Filed: Apr. 7, 1999

[51] Int. Cl.[7] .................................................. B60P 9/00
[52] U.S. Cl. ........................... 414/462; 414/546; 414/557
[58] Field of Search .................... 414/557, 462, 414/546

[56] References Cited

U.S. PATENT DOCUMENTS

| | | | |
|---|---|---|---|
| 3,233,758 | 2/1966 | Darfus | 414/546 X |
| 3,842,997 | 10/1974 | Sprikkelman | 414/557 |
| 3,913,811 | 10/1975 | Spencer | 224/42.08 |
| 3,931,903 | 1/1976 | Johnson | 214/450 |
| 4,040,534 | 8/1977 | Kenworthy | 214/766 |
| 4,073,532 | 2/1978 | Blair | 294/107 |
| 4,084,736 | 4/1978 | Jacobs, Jr. | 224/42.03 B |
| 4,381,069 | 4/1983 | Kreck | 224/42.44 |
| 4,702,489 | 10/1987 | Erickson | 280/479 A |
| 4,710,090 | 12/1987 | DeLuca et al. | 414/546 X |
| 4,787,809 | 11/1988 | Zrostlik | 414/557 |
| 4,881,864 | 11/1989 | Amato | 414/543 |
| 4,940,096 | 7/1990 | Johnson | 172/443 |
| 5,038,983 | 8/1991 | Tomososki | 414/462 X |
| 5,137,411 | 8/1992 | Eul et al. | 414/462 |
| 5,205,700 | 4/1993 | Lin et al. | 414/540 |
| 5,456,564 | 10/1995 | Bianchini | 414/462 |
| 5,540,437 | 7/1996 | Welch | 414/462 |
| 5,651,653 | 7/1997 | Bablo | 414/24.5 |

FOREIGN PATENT DOCUMENTS

| | | | |
|---|---|---|---|
| 614629 | 6/1935 | Germany | 414/557 |

*Primary Examiner*—Steven A. Bratlie
*Attorney, Agent, or Firm*—Gifford, Krass, Groh, Sprinkle, Anderson & Citkowski, P.C.

[57] ABSTRACT

A lifting attachment is disclosed for use in conjunction with a trailer hitch mounted to a vehicle. The lifting attachment includes a support assembly which is detachably connected to the trailer hitch and this support assembly includes a vertically extending support beam. The attachment includes a platform having a generally planar top and an elongated arm having one end pivotally connected to the platform and a second end pivotally connected to the support beam. A hydraulic piston and cylinder assembly is pivotally connected between the support beam and an intermediate point on the arm so that extension and retraction of the piston within the cylinder selectively raises and lowers the platform.

9 Claims, 4 Drawing Sheets

TRAILER HITCH MOUNTED LIFTING ATTACHMENT

BACKGROUND OF THE INVENTION

1. Field of the Invention

The present invention relates generally to vehicle attachments and, more particularly, to a lifting attachment for use with a vehicle having a trailer hitch.

2. Description of the Prior Art

Pickup trucks, vans and the like (hereafter collectively referred to as pickup trucks) of the type having a flat rear bed are becoming increasingly popular vehicles for general use. One reason for the increasing popularity of pickup trucks is their ability to carry both large and heavy cargo in the truck bed. A still further reason for the increased popularity of pickup trucks is their ability to tow trailers, boats and other types of loads behind the pickup truck. For this reason, many pickup trucks are equipped with trailer hitches, e.g. the type in which a square tube extends rearwardly from beneath the truck bed of the pickup truck.

Even though pickup trucks are particularly useful for carrying heavy loads, it is oftentimes difficult to place the load into the bed of the pickup truck due to the weight of the load. For example, in many situations where the load cannot be simply hand lifted into the bed of the pickup truck, ramps, come alongs and the like are oftentimes used to load the cargo into the truck bed. The use of ramps, come alongs and the like to load heavy cargo into the truck bed, however, is oftentimes not only difficult, but also frequently impractical.

SUMMARY OF THE PRESENT INVENTION

The present invention provides a lifting attachment for use with a pickup truck having a trailer hitch which overcomes all of the above-mentioned disadvantages of the previously known devices.

In brief, the lifting attachment of the present invention comprises a support assembly which is detachably connectible with the trailer hitch. This support assembly, furthermore, includes a vertically extending support beam.

The lifting attachment further comprises a generally rectangular platform having a planar top. An elongated arm has a first end pivotally connected to the platform and a second end pivotally connected to the support beam.

A piston and cylinder assembly is provided for moving the platform between a lower and an upper position. The cylinder is pivotally connected to either the support beam or an intermediate point on the arm while the piston is pivotally connected to the other of the support beam and the intermediate point on the arm. In doing so, the support beam, arm and piston and cylinder assembly form a triangular three point configuration.

The piston and cylinder is preferably a manually operated hydraulic piston and cylinder. Upon actuation such that the piston extends outwardly from the cylinder, the cooperation between the piston and cylinder assembly, arm and support beam causes the platform to move from a lower and toward an upper position. Conversely, retraction of the piston within the interior of the cylinder reverses the movement of the platform from its upper and to its lower position.

Preferably, the platform includes a bottom wall, top wall and a side wall extending between at least a portion of the top and bottom walls. The top wall, furthermore, is movable away from the side walls thus forming a storage area between the top, bottom and side walls. Preferably, the storage area is sufficiently large so that, when not in use, the support assembly, elongated arm and piston and cylinder assembly may be stored within the interior of the platform.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which.

DETAILED DESCRIPTION OF PREFERRED EMBODIMENTS OF THE PRESENT INVENTION

Figure 1:
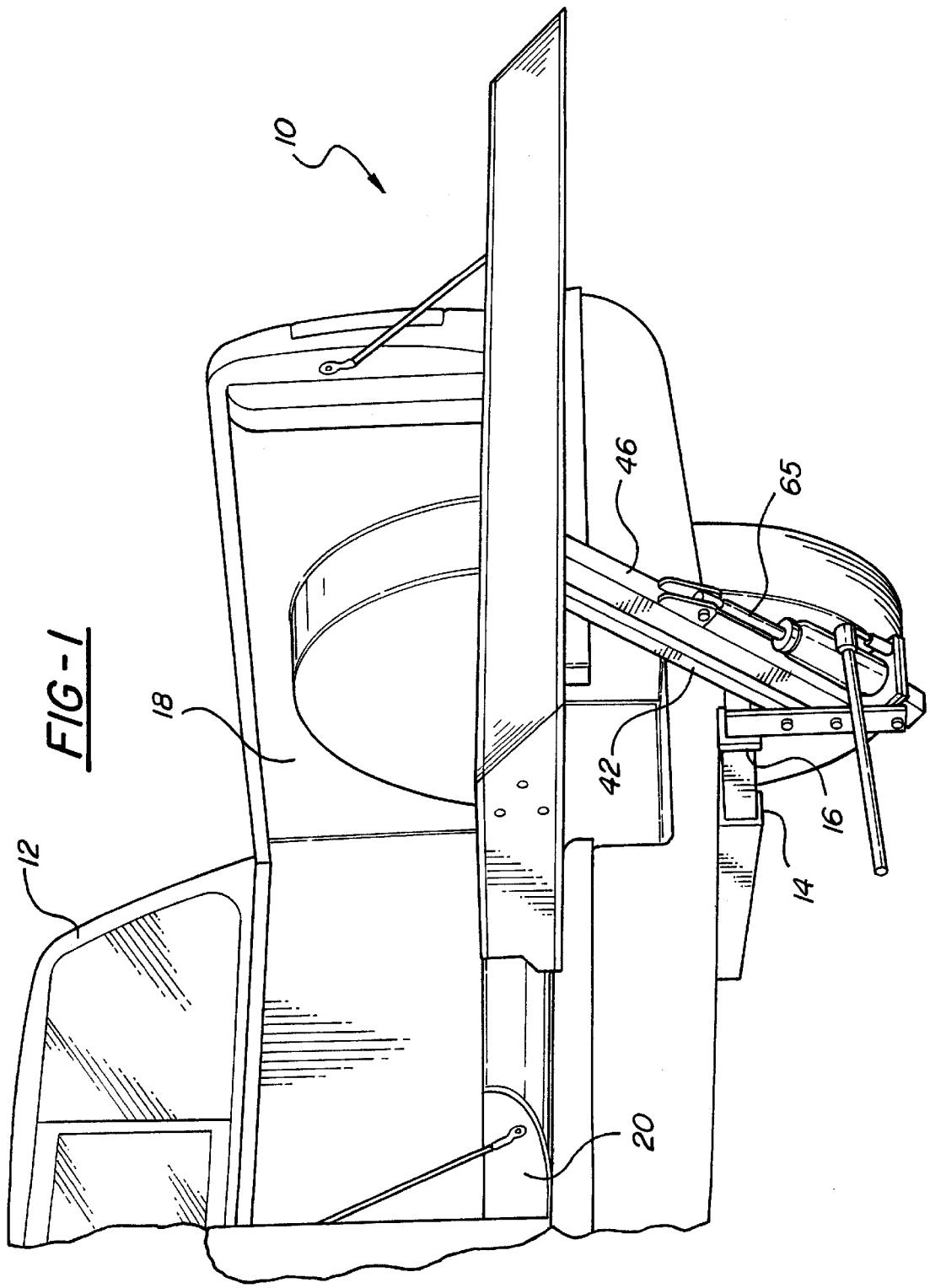
FIG. 1 is a fragmentary rear view illustrating a preferred embodiment of the present invention.
Figure 3:
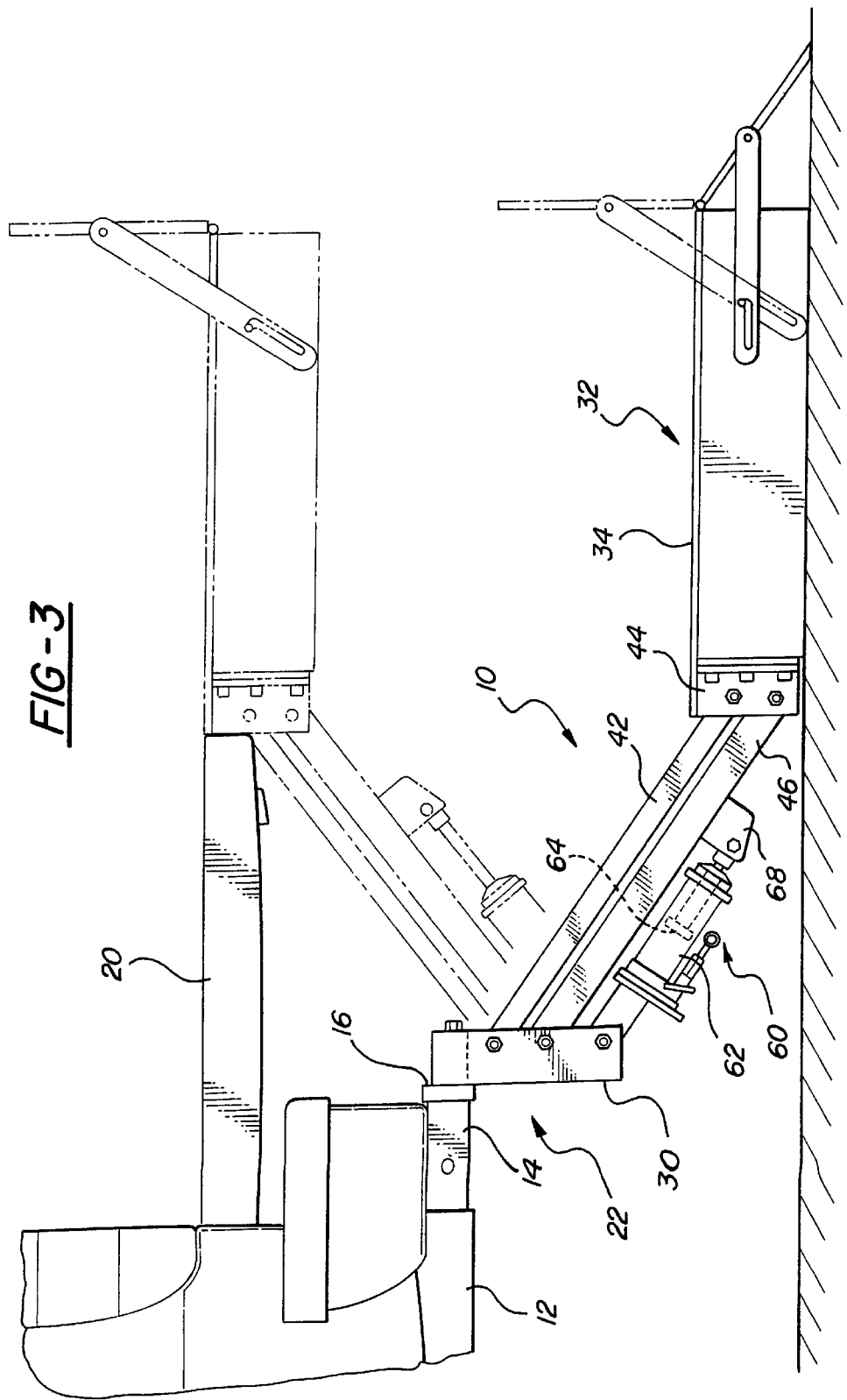
FIG. 3 is a side view illustrating the preferred embodiment of the present invention.

With reference first to FIGS. 1 and 3, a preferred embodiment of the lifting attachment 10 of the present invention is there shown for use with a vehicle 12 having a trailer hitch 14. The trailer hitch 14 shown in FIGS. 1 and 3 is conventional in construction and includes a square metal tube which is open at its rearwardly facing end 16. Such a hitch is commonly used to tow a trailer behind the vehicle 12.

The vehicle 12 illustrated in FIGS. 1 and 3 is shown as a pickup truck having a truck bed 18 (FIG. 1) as well as a tail gate 20 movable between a horizontal open position (illustrated in FIGS. 1 and 3) and a vertically extending closed position. It will be understood, however, that the lifting attachment 10 of the present invention can be used with other types of vehicles 12 other than a pickup truck.

Figure 2:
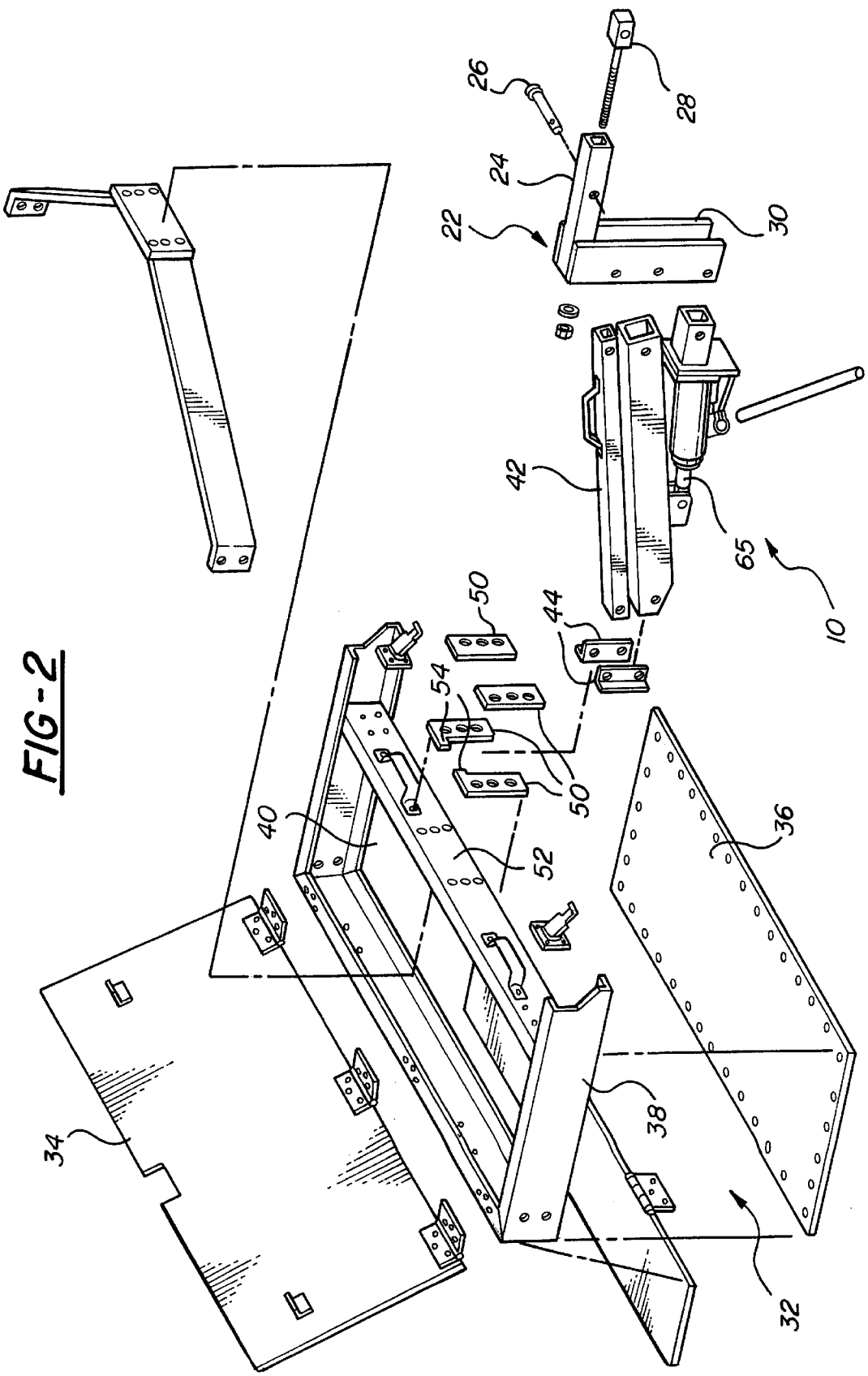
FIG. 2 is an exploded view illustrating a preferred embodiment of the present invention.

Referring now particularly to FIGS. 2 and 3, the lifting attachment 10 includes a support assembly 22 having a rectangular channel 24 (FIG. 2) which is slidably received within the trailer hitch 14. Any conventional means, such as a cross pin 26 or draw bar arrangement 28 (FIG. 2), may be used to detachably secure the rectangular channel 24 to the trailer hitch 14.

The support assembly 22 further includes a vertically extending support beam 30. The support beam 30 preferably extends downwardly from the rectangular channel 24.

Still referring to FIGS. 2 and 3, the lifting attachment further comprises a generally rectangular platform 32 having a top wall 34, bottom wall 36 and a side wall 38 extending between at least a portion of the top wall 34 and bottom wall 36. Consequently, the area between the top wall 34, bottom wall 36 and side walls 38 forms a storage compartment 40. The utilization of this compartment 40 will be subsequently described.

Still referring to FIGS. 2 and 3, a first elongated arm 42 has one end pivotally connected to the support beam 30 while its other end is pivotally connected to a pivot bracket 44. Similarly, a second elongated arm 46 has one end pivotally connected to the support beam 30 and its other end pivotally connected to the pivot bracket 44. Furthermore, the elongated arms 42 and 46 are not only parallel to each other, but are also equal in length between their pivotal connections between the support beam 30 and the pivot bracket 44.

As best shown in FIG. 2, the pivot bracket 44 is slidably detachably connected by a slide bracket 50 to one side 52 of the platform 32. The slide bracket 50 thus enables the pivot support 44 to be slidably received from the bottom of the slide bracket 50 until the pivot support 44 abuts against two inwardly facing tabs 54 at the top of the support bracket. The tabs 54 thus limit the upward movement of the pivot support 44 with respect to the slide bracket 50.

With the pivot support 44 slidably mounted to the slide bracket 50 as shown in FIG. 3, the platform 32 is movable between a lower position, illustrated in solid line in FIG. 3, and an upper position, illustrated in phantom line in FIG. 3. Furthermore, since the arms 42 and 46 are parallel to each other and of the same distance between their pivotal connections, the arms 42 and 46 slightly pivot the platform and ensure that the top wall 34 remains substantially horizontal as the platform 32 moves between its upper and its lower positions.

As best shown in FIGS. 1 and 3, a piston and cylinder assembly 60 is used to move the platform 32 between its raised and its lowered position. The piston and cylinder assembly 60 preferably is a manually operated hydraulic piston and cylinder assembly having a piston 62 pivotally connected to either the support beam 30 or an intermediate point of the arm 46. Conversely, a rod 65 attached to the piston 64 (FIG. 3) is pivotally connected to the other of the support beam 30 and the bracket 68 secured to an intermediate point of the arm 46.

As best shown in FIG. 3, with the piston 64 in its retracted position, the platform 32 is in its lower position. Conversely, as the piston and cylinder assembly is actuated to extend the piston 64 with its attached piston rod 65, the piston and cylinder assembly 60 moves the platform 32 to its raised position due to the three point connection between the arm 46, piston and cylinder arrangement 60 and the support beam 30.

As best shown in FIGS. 1 and 3, the arms 42 and 46, as well as the piston and cylinder assembly 60, are dimensioned so that, with the platform 32 in its raised position, the top wall 34 of the platform 32 is substantially vertically aligned with the tail gate 20 when in its lower position. Furthermore, the platform 32 is preferably closely adjacent the back end of the tail gate 20 when the tail gate is in its lower position and the platform 32 is in its raised position so that a load positioned on the platform 32 can be easily slid across the tail gate 20 and into the pickup truck bed 18.

Figure 4:
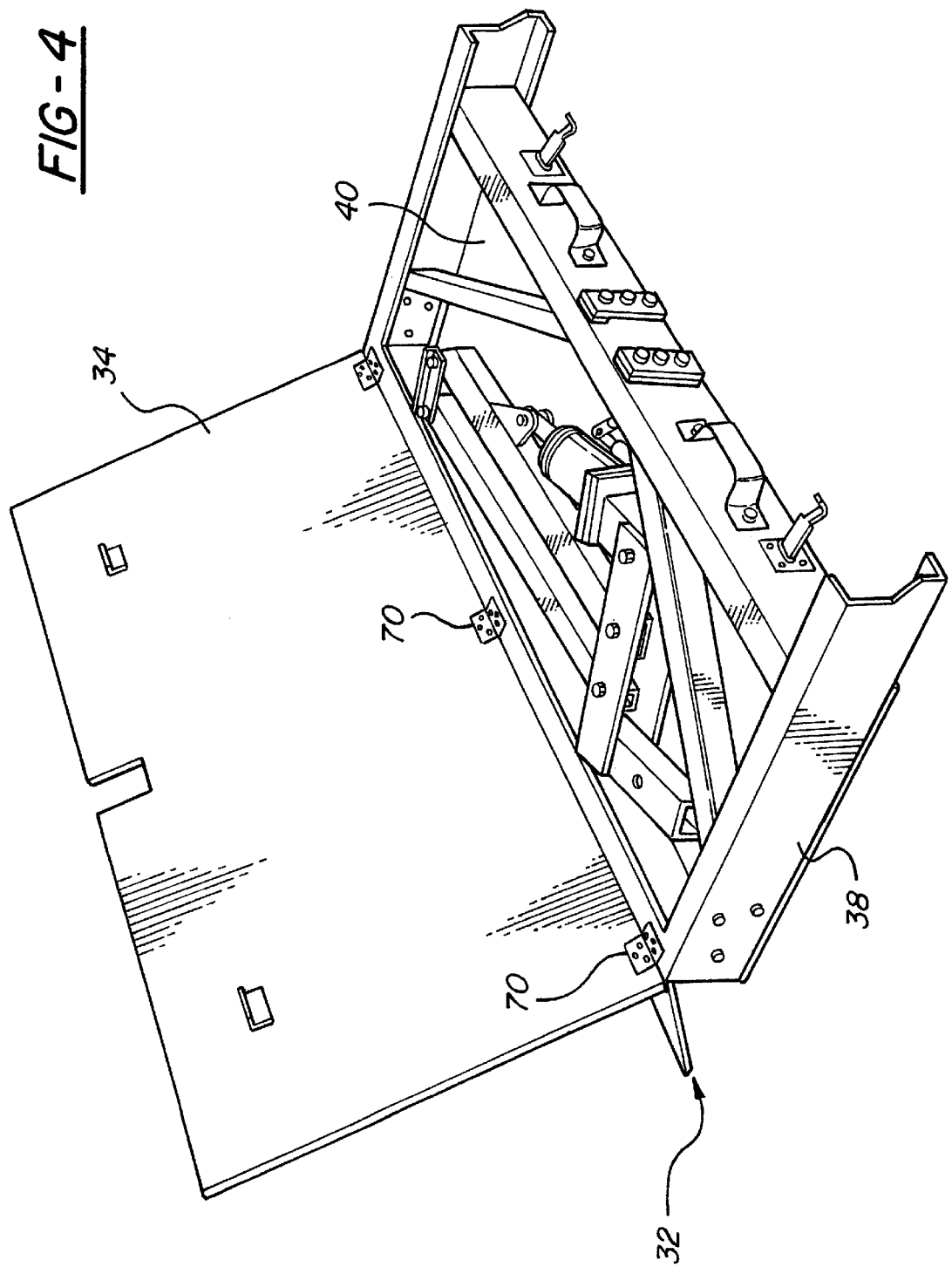
FIG. 4 is an elevational view illustrating the storage of the preferred embodiment of the present invention.

With reference now to FIG. 4, as has been previously described, the pivot support 44 is detachably connected to the platform 32 while, similarly, the support assembly 22 is detachably connected to the trailer hitch 14. Preferably, the compartment 40 formed between the top, bottom and side walls of the platform is dimensioned so that the support assembly 22, anus 42 and 46 as well as the piston and cylinder assembly 60, when detached from the hitch 14 and platform 32, can be conveniently stored within the platform compartment 40. In order to facilitate such storage, the platform top 34 is preferably either pivotally secured by hinges 70 or removably secured to the side wall 38 to provide easy access to the compartment 40.

Having described my invention, it can be seen that the present invention provides a simple and yet highly effective lifting attachment for use with a vehicle having a trailer hitch. Having described my invention, however, many modifications thereto will become apparent to those skilled in the art to which it pertains without deviation from the spirit of the invention as defined by the scope of the appended claims.

We claim:

1. A lifting attachment for use in conjunction with a trailer hitch mounted to a vehicle comprising:

a support assembly detachably connectible with the trailer hitch, said support assembly including a vertically extending support beam, a platform, an elongated arm having a first end pivotally connected to said platform and a second end pivotally connected to said support beam, a piston and cylinder assembly comprising a cylinder and a piston slidably mounted in said cylinder and movable between a retracted and an extended position, and a piston rod secured to said piston and extending outwardly from one end of said cylinder, said cylinder being pivotally connected to one of said support beam and an intermediate point of said arm, and a free end of said piston rod being pivotally connected to the other of said support beam and an intermediate point of said arm wherein said platform comprises a top wall, a bottom wall and a side wall extending between at least a portion of said top wall and said bottom wall, said top wall, said bottom wall and said side wall forming a storage area dimensioned to receive said arm, said support beam and said piston and cylinder assembly.

2. The invention as defined in claim 1 and comprising a second elongated arm having a first end pivotally connected to said platform and a second end pivotally connected to said support beam, said first and second arms being parallel to each other.

3. The invention as defined in claim 1 wherein said piston and cylinder assembly comprises a hydraulic piston and cylinder assembly.

4. The invention as defined in claim 1 wherein said top wall is pivotally connected to said side wall.

5. The invention as defined in claim 1 wherein said piston and cylinder assembly comprises a manually operated hydraulic piston and cylinder assembly.

6. The invention as defined in claim 1 wherein said piston and cylinder assembly is positioned beneath said arm.

7. The invention as defined in claim 1 wherein the hitch comprises a rectangular tube open at one end, and wherein said support assembly comprises a rectangular bar insertable into said tube.

8. The invention as defined in claim 1 wherein the vehicle is a pickup truck having a tail gate movable between a vertical closed position and a horizontal open position, and wherein said arm is dimensioned so that, with said piston in an extended position and the tail gate in the open position, said platform is substantially vertically aligned with and closely adjacent the tail gate.

9. The invention as defined in claim 1 wherein said first end of said arm is pivotally connected to a pivot support, said pivot support being detachably connected to said platform.

* * * * *